US005745613A

United States Patent [19]
Fukuchi et al.

[11] Patent Number: 5,745,613
[45] Date of Patent: Apr. 28, 1998

[54] WAVELENGTH-DIVISION MULTIPLEXING OPTICAL COMMUNICATION APPARATUS AND METHOD THEREFOR

[75] Inventors: Kiyoshi Fukuchi; Takashi Ono, both of Tokyo, Japan

[73] Assignee: NEC Corporation, Tokyo, Japan

[21] Appl. No.: 759,689

[22] Filed: Dec. 6, 1996

[30] Foreign Application Priority Data

Dec. 15, 1995 [JP] Japan ................................. 7-347682

[51] Int. Cl.⁶ ............................................. G02B 6/28
[52] U.S. Cl. ........................... 385/24; 385/1; 385/15; 385/20; 385/31; 359/181; 359/114; 359/180; 359/189
[58] Field of Search ........................... 385/24, 1, 4, 15, 385/20, 21, 22, 23, 31, 45, 46; 359/181, 114, 124, 154, 159, 180, 189

[56] References Cited

U.S. PATENT DOCUMENTS

| | | | |
|---|---|---|---|
| 4,847,477 | 7/1989 | Smith | 372/29 X |
| 5,394,489 | 2/1995 | Koch | 385/14 |
| 5,631,758 | 5/1997 | Knox et al. | 359/127 |

FOREIGN PATENT DOCUMENTS

| | | |
|---|---|---|
| 0 297 504 A2 | 1/1989 | European Pat. Off. |
| 0 539 177 A2 | 4/1993 | European Pat. Off. |
| 2 276 788 | 10/1994 | United Kingdom |

OTHER PUBLICATIONS

R.W. Tkach et al.; "One–Third Terabit/s Transmission Through 150 km of Dispersion–Managed Fiber"; European Conference on Optical Communication, ECOC '94, Post–deadline Papers, pp. 45–48.

J.A.J. Fells et al.; "Transmission beyond the dispersion limit using a negative chirp electroabsorption modulator"; Electronics Letters, 7 Jul. 1994, vol. 30, No. 14, pp. 1168–1169.

*Primary Examiner*—Phan T. H. Palmer
*Attorney, Agent, or Firm*—Whitham, Curtis, Whitham & McGinn

[57] ABSTRACT

A wavelength division-multiplexing optical communication apparatus and method includes a plurality of modulators for respectively modulating the intensity of a plurality of light rays, each having a different wavelength from one another, with a data signal from a signal source, a wavelength division-multiplexer for combining the light from the modulators, fiber optics for transmitting light from the wavelength division multiple and a wavelength division-multiplexed light receiver for separating the light from the transmission path fiber optics by wavelength (and receiving the separated light, respectively. The light modulators control or select a magnitude of the phase modulation caused at the time of intensity modulation, and the modulator for each light wavelength is separately controlled and selected for the operating point, so as to cause a phase modulation component which minimizes the waveform distortion after transmission through the transmission path fiber optics. Hence, the apparatus is not limited in its wavelength range or transmission distance caused by waveform distortion due to the wavelength dependency of dispersion of transmission path.

20 Claims, 8 Drawing Sheets

WAVELENGTH-DIVISION MULTIPLEXING OPTICAL COMMUNICATION APPARATUS AND METHOD THEREFOR

BACKGROUND OF THE INVENTION

The present invention generally relates to a fiber optic communication apparatus, and, more particularly, to a wavelength division multiplexing communication apparatus and method for performing transmission by dividing and multiplexing a plurality of wavelengths.

DESCRIPTION OF THE RELATED ART

Recently, fiber optic communication has become widely employed for long distance and high capacity communication (e.g., for use as trunks and the like in overseas telephone communication) by making use of the low loss and wide bandwidth inherent to fiber optics. Presently, advances in time division multiplex signal rate and wavelength division multiplexing technology are being studied for increasing the transmission capacity of the fiber.

To increase the time-division multiplex signal rate, a rate of 20 Gb/s (gigabits per second) for an NRZ (Non-Return-to-Zero) pulse transmission system is currently being used.

On the other hand, for wavelength division-multiplexing technology (WDM), studies are being performed on optimum design of the optical amplifier and waveform distortion by the nonlinear optical (NLO) effect between multiple light waves. For example, experiments on multi-wavelength optical fiber transmission for eight waves or more, have been reported.

Recently, research of very-high-capacity transmission has been reported including an experiment on transmission through multiplexing of 17 waves of 20 Gb/s signals (for example, see R. W. Tkach, et al., "One-Third Terabit/s Transmission Through 150 km of Dispersion-Managed Fiber," European Conference on Optical Communication, ECOC '94, Post-deadline Papers, p. 45).

However, in a fiber optics communication system, transmission quality deteriorates due to wavelength distortion from wavelength dispersion by fiber optics (hereinafter also abbreviated as "dispersion"). This effect becomes more serious as signal rates are increased.

For example, when the transmission rate reaches 20 Gb/s (similarly to that in the system mentioned above), the maximum amount of dispersion making deterioration of sensitivity after transmission 1 dB, becomes about 150 ps/nm. Thus, a dispersion compensation technique is required to transmit a high-speed signal with a transmission rate of 20 Gb/s over a long distance.

Conventional dispersion compensation techniques include, for example, dispersion compensation fiber or an optical transversal filter.

Fiber optics dispersion depends on the wavelength of light being transmitted. On standard normal dispersion fiber, the dispersion value increases 0.07 ps/nm-km as the wavelength increases by 1 nm.

Due to the wavelength dependency of fiber optics dispersion, in a wavelength division-multiplexing communication system which uses a plurality of wavelengths, each wave has a different dispersion value. For example, if the difference between the longest wavelength and the shortest wavelength is 20 nm, the difference in dispersion value between the maximum and minimum wavelength is 140 ps/nm after transmission through 100 km of fiber optics.

In this case, even if dispersion for either the maximum or minimum wavelength is compensated for by the above-mentioned dispersion compensation technique, significant residual dispersion (or over-compensation) occurs in the other of the maximum or the minimum wavelength, so that the wavelength is deteriorated. There is significant residual dispersion or over-compensation due to the above-mentioned dispersion compensation devices usually not providing perfectly reversed wavelength-dependency of the dispersion against that of the transmission fiber. Hence, while the maximum (or conversely the minimum) wavelength dispersion may be compensated, the minimum (or conversely the maximum) wavelength dispersion is still present.

Therefore, transmission in which deterioration of all wavelengths to be multiplexed is minimized, becomes difficult. Moreover, the wavelength dependency of dispersion becomes a considerable limiting factor when high-speed signals are transmitted through a wavelength division-multiplexing operation.

To avoid the deterioration caused by the wavelength dependency of dispersion, dispersion compensation, may for example, be separately provided for each wavelength to be multiplexed. However, a dispersion compensation device is costly so that provision of a plurality of dispersion compensation devices respectively corresponding to wavelengths to be multiplexed, prohibitively increases the system's cost.

Furthermore, a dispersion compensation fiber which compensates for the wavelength dependency of dispersion of the transmission path fiber optics is being studied as a device for collectively dispersion-compensating for a number of wavelengths. However, since the dispersion compensation fiber has a complex structure, high costs and manufacturing inefficiencies still result.

SUMMARY OF THE INVENTION

In view of the foregoing problems of the conventional devices, it is an object of the present invention to provide a simple wavelength division multiplexing fiber optics communication apparatus in a wavelength division multiplexing fiber optics communication system and method which avoid limitation on wavelength range and/or on the maximum transmission distance resulting from wavelength distortion due to the wavelength dependency of dispersion in a transmission path.

To attain the above and other objects, features and advantages, in a first aspect, the present invention provides a wavelength division multiplexing fiber optics communication apparatus and method including a plurality of optical modulators for respectively modulating an intensity of light, each light having a different wavelength from one another, with respective signals to be transmitted, a wavelength-division multiplexer for combining the light from the plurality of optical modulators, fiber optics for transmitting wavelength-division-multiplexed light from the wavelength-division multiplexer, and an optical receiver for separating the wavelength-division multiplexed light by wavelength and receiving the separated wavelength division multiplexed light, respectively.

Preferably, a magnitude in one of a change of phase modulation and a phase modulation is different for each of the plurality of optical modulators.

Additionally, in another aspect of the present invention, in a wavelength-division multiplexing fiber optics communication apparatus in which values of wavelength of the plurality of light sources and wavelength dispersion values of the fiber optics in each wavelength of the light sources are known, each of the optical modulators corresponding to the light sources is controlled, for the light sources emitting light of wavelength for which the dispersion value of the fiber optics becomes negative, to increase the phase of light as the intensity of light increases, and, for the light sources emitting light of wavelength for which the dispersion value of the fiber optics becomes positive, to decrease the phase of light as the intensity of light increases.

With the unique and unobvious structure and method of the invention, dispersion compensation is provided for each wavelength to be multiplexed, and thereby deterioration caused by the wavelength dependency of dispersion is minimized, with a simple, inexpensive arrangement and without having to provide a separate, dedicated dispersion compensation device for each individual wavelength to be multiplexed.

Thus, the system's cost is not prohibitively increased, and yet dispersion compensation of each wavelength is provided.

DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Referring now to the drawings, the principles and operation of the present invention will now be described in detail.

Figure 1:
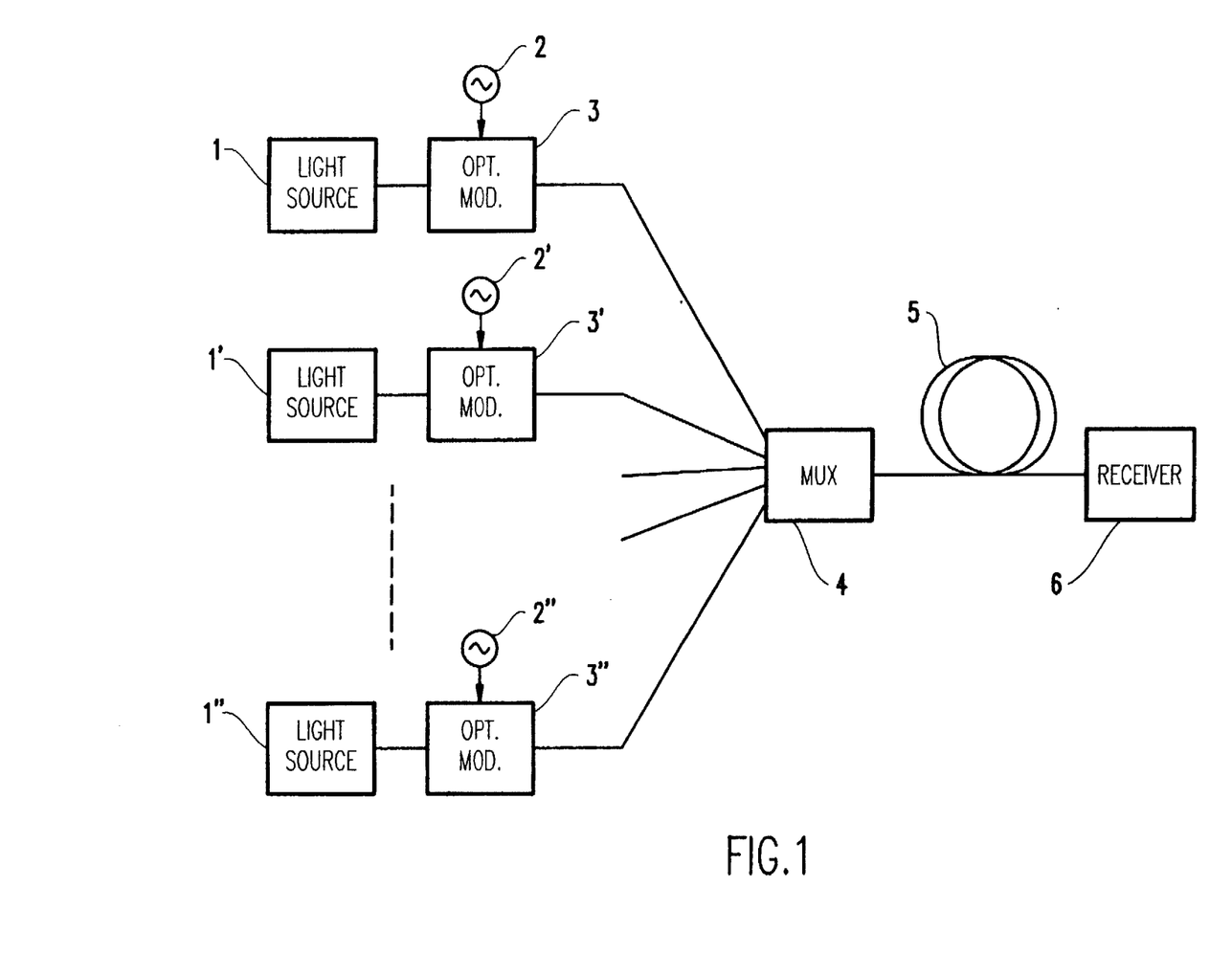
FIG. 1 illustrates an arrangement of a first embodiment of a wavelength division multiplexing fiber optics communication apparatus according to the present invention.

FIG. 1 illustrates a first embodiment of the wavelength division multiplexing optical communication apparatus according to the present invention, which includes a plurality of light sources 1–1" each for outputting light having a different wavelength, a plurality of optical (e.g., light intensity) modulators 3–3" for respectively modulating the intensity of light from the light sources with a data signal provided from signal sources 2–2", a wavelength division-multiplexer 4 for multiplexing and combining the light from the optical modulators 3–3", fiber optics 5 for transmitting light from the wavelength division-multiplexer 4, and a wavelength division-multiplexed light receiver 6 for receiving and separating the light from the transmission path fiber optics by wavelength, respectively.

Each of the optical modulators 3–3" controls or selects a magnitude of the phase modulation resulting during intensity modulation, and the optical modulator 3 for each light wavelength is separately controlled and selected for the operating point so as to cause a phase modulation component which minimizes the waveform distortion after transmission through the transmission path fiber optics 5.

Before turning to the specific structure of the invention, the general principles and operations underlying the present invention will be described hereinbelow.

Generally, in the optical modulator, the light phase changes at the same time that the light intensity changes. The component of the phase change of light is hereinafter called "chirp."

When signal light subject to the "chirp" propagates through a transmission path with dispersion, waveform compression/expansion occurs due to the chirp and dispersion. Consequently, the waveform after transmission and deterioration of the code error rate vary depending on the chirp magnitude. The chirp magnitude is defined by using a $\alpha$ parameter (also called an "amount of chirp") given by the following equation (1).

$$\alpha = d\Phi/(2IdI) \tag{1}$$

In the above equation (1), I is the intensity of light, $dI\Phi$ is the variation of the intensity of light, and $d\Phi$ is the variation of the phase of light.

Figure 2:
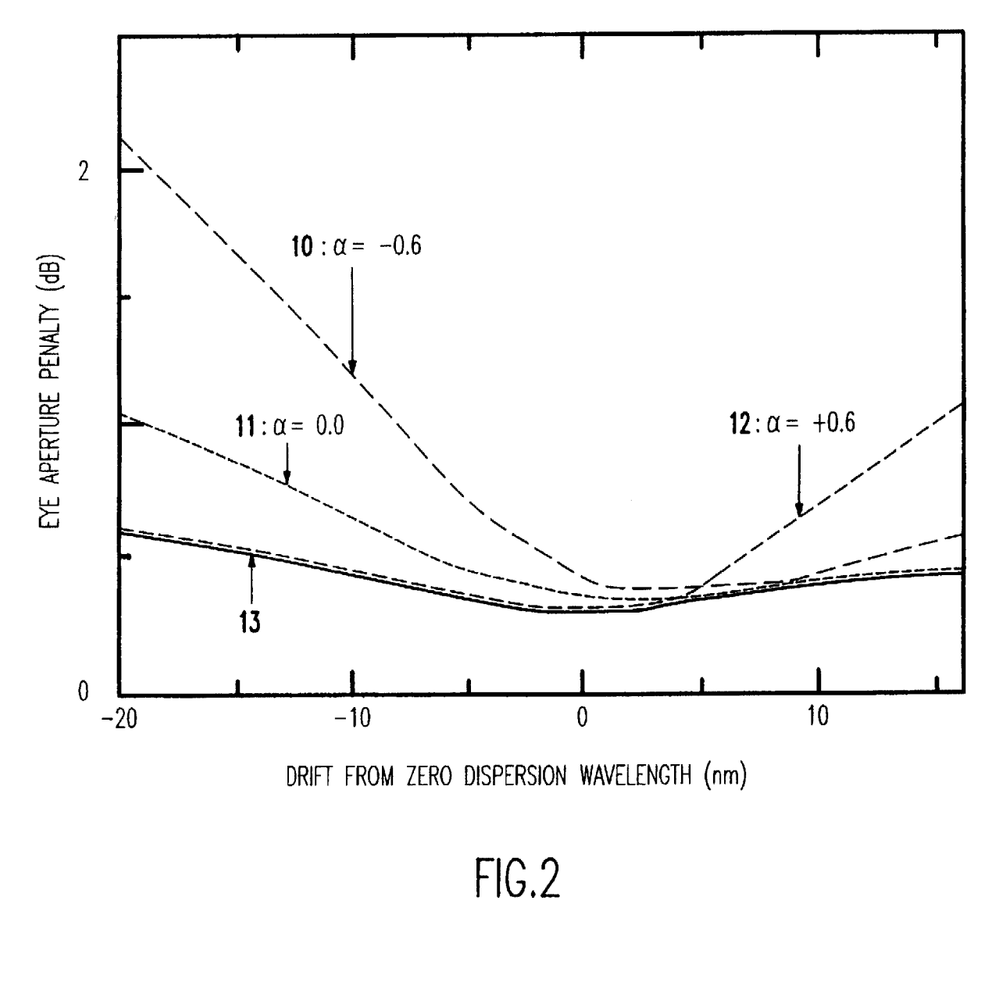
FIG. 2 is a graph showing results of calculation for eye aperture penalty after transmission over 100 km of ordinary dispersion fiber optics for values of $\alpha$ of output light at $-0.6$, $0.0$, and $+0.6$.

FIG. 2 illustrates a graph in which the "eye" (e.g., optical) aperture ratio is calculated for $\alpha=-0.6$ (as shown by curve 10 in FIG. 2), $\alpha=0.0$ (as shown by curve 11 in FIG. 2), and $\alpha=+0.6$ (as shown by curve 12 in FIG. 2) when 20 Gb/s signals on one wave is transmitted over 100 km of conventional dispersion fiber and dispersion compensated for by a dispersion compensation fiber. For purposes of this application, a "conventional dispersion fiber" is defined as a standard step-index single-mode fiber which has a dispersion of, for example, approximately 17 ps/nm-km.

In FIG. 2, the axis of the abscissa (i.e., X-axis) represents a wavelength of light used for transmission with an amount of drift form zero dispersion wavelength (in nm), whereas the axis of the ordinate (i.e., Y-axis) represents the eye aperture ratio (aperture ratio of an eye pattern) in decibels (dB) (usually referred to as the "eye aperture penalty"). As commonly known, the "eye-aperture penalty" is a ratio between the signal eye aperture before and after transmission and therefore it is unitless. It is obtained by, first measuring the maximum voltage swings between maximum "0" level and minimum "1" level in the eye-diagram for the signal before and after transmission at the same average power, and then taking the ratio of the two voltage swings. As shown, a larger eye aperture penalty generally provides a smaller aperture of an eye pattern after transmission (e.g., larger waveform distortion).

As shown in FIG. 2, when the $\alpha$ parameter is $-0.6$ (e.g., the phase of light decreases as the intensity of light increases), a low eye aperture penalty occurs at longer wavelengths. At longer wavelengths, when $\alpha$ is $-0.6$, the residual dispersion in the transmission path is a positive value, so that the waveform is compressed by the dispersion and the chirp, and a good eye aperture can be obtained. Because the dispersion value increases as the wavelength increases, as previously mentioned above, the residual dispersion is positive for longer wavelengths than zero-dispersion wavelength. The α does not relate to the dispersion value.

When the α parameter is +0.6 (e.g., the phase of light increases as the intensity of light increases), the region with low eye aperture penalty occurs at a shorter wavelength. Thus, the region with lower eye aperture penalty varies depending on the chirp.

A unique and unobvious aspect of the present invention is that it uses the difference in the eye aperture penalty characteristics which occur with differing amounts of chirp.

That is, the present invention separately controls the operating point which determines the amount of phase modulation of light in the optical modulator for each of a plurality of optical modulators. Such separate control is performed such that the phase change (e.g., chirp) minimizing deterioration of the waveform for the dispersion value of the transmission path for each wavelength, is output as "emitting" (e.g., outputted) light.

With the invention, first, the value of the α parameter that causes the eye aperture to be low for each wavelength is selected for each signal wavelength used by the system, as is the zero dispersion wavelength of the transmission path so as to produce the characteristic curves of FIG. 2. Thus, the operating condition of each optical modulator is established so that the optimum value of the selected α parameter can be obtained for each wavelength.

The eye aperture penalty thus obtained for the wavelength division-multiplexing signal after transmission is as shown by the curve 13 of FIG. 2. That is, the region with low eye aperture penalty is significantly extended when compared with the case when all optical modulators are operated with a single (fixed) α parameter as shown by the exemplary curves 10–12 in FIG. 2. Thus, the present invention uses an optimum α parameter for the optical modulators so as to obtain the lowest possible eye aperture penalty.

Additionally, when the range of wavelength is limited to a specific value, the distance for which each wavelength can be transmitted can be separately extended by the selected α parameter, such that the maximum distance for transmission can be extended for the overall wavelength division-multiplexing communication system.

Hereinbelow and referring to the drawings, embodiments of the present invention will be explained in detail.

As mentioned above and as shown in FIG. 1, a wavelength division-multiplexing fiber optics communication apparatus according to a first embodiment includes a plurality of light sources with different wavelengths 1–1". Preferably, the light sources are formed of single-mode distributed-feedback (DFB) lasers. The range of wavelengths is preferably within a range of 1520 nm and 1570 nm where the loss of fiber optics is minimized. For example, trunk lines and high capacity transmission lines are exemplary applications, but of course, this should not be construed as limiting the scope of the present invention.

A plurality of optical intensity modulators 3–3" (discussed in further detail below) modulate the intensity of light from the light sources 1–1" with data signals transmitted by from signal sources 2–2", respectively.

A wavelength division-multiplexer 4, preferably formed of an arrayed waveguide gratings (AWG), combines the light from the plurality of optical modulators 3–3", and fiber optics (e.g., fiber optic cabling or the like) 5 transmit the multiplexed wavelength light from the wavelength division-multiplexer 4.

The fiber optics 5 for the transmission path may be any type of fiber optic cabling/path so long as the zero dispersion wavelength and the wavelength dependency of dispersion value are known. However, preferably a combination of a normal dispersion fiber with a high dispersion value and a dispersion compensation fiber is selected, so as to avoid mixture of four light waves in wavelength division-multiplexing transmission. The dispersion of the standard fiber is approximately 17 ps/nm-km, while the dispersion compensation fiber usually provides –100 ps/nm-km. Therefore, ⅙ of a standard fiber length is required for the dispersion compensation fiber.

Preferably, the fiber optics has a diameter of 125 μm or the fiber optic cable has a 10 mm, and is provided in spans of 80 to 120 km.

Fiber amplifier repeaters and the like may be employed in the transmission path before or after the fiber optics 5 depending upon the system design. However, if the system transmission length becomes longer, the scheme is not advantageous.

A wavelength division-multiplexing receiver 6 receives the light from the transmission path fiber optics 5 by separating it into each wavelength. Receiver 6 preferably is formed of a AWG for wavelength-division demultiplexer and optical preamplifier receivers for all wavelength channels.

Preferably, the optical modulator 3 comprises a Mach-Zehnder modulator with a "push-pull" drive (e.g., a driving system having a "push" electrode and a "pull" electrode as is conventionally known) which can freely set values of the α parameter. The Mach-Zehnder modulator is commercially available and, as is well known, is a Mach-Zehnder interferometer which is modified to be a light waveguide (including, for example, $LiNbO_3$). The Mach-Zehnder modulator has the advantage that the chirp may be adjusted to the bit rate and the transmission distance.

In the Mach-Zehnder modulator, input light is equally divided by an input Y-branch, separately propagates through each waveguide at a phase transition section (e.g., a section with the push-pull electrode), is recombined at an output Y-branch, and emitted. In the push-pull driven Mach-Zehnder optical modulator, the refractive index of the modulator is varied in opposite directions in two waveguides (e.g., arms) having a voltage (e.g., 2V) applied thereto.

Figure 4:
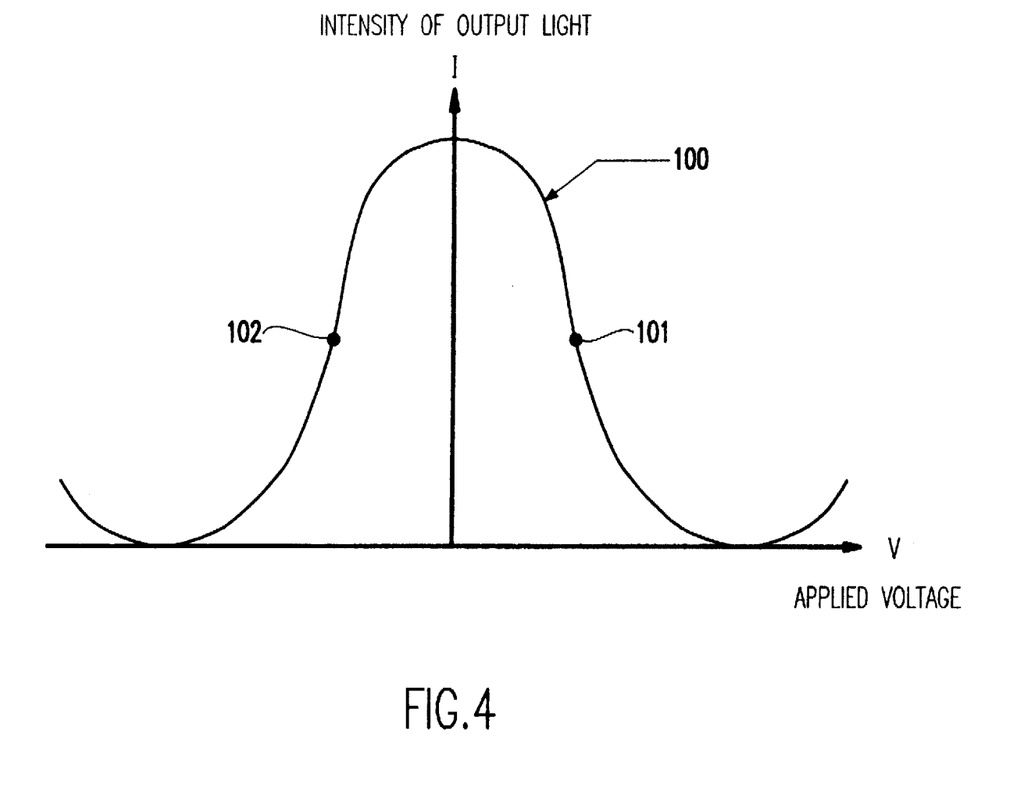
FIG. 4 is a graph illustrating two operating points of a single-electrode-driven Mach-Zehnder optical modulator and values of corresponding $\alpha$ of output light.

On the other hand, as shown in FIG. 4, the modulator can be used, since values (e.g., having the same absolute value but having different signs from each other) of the α parameter at two operating points 101, 102 (e.g., the middle point of the maximum amplitude) can be set even in a Mach-Zehnder optical modulator driven with a single electrode (e.g., by grounding one of the two electrodes, for example).

FIG. 4 shows the relationship between the input voltage V and the light output intensity I (e.g., a transfer function) of a single-electrode-driven Mach-Zehnder optical modulator, which is given by, for example, the relationship of $I=I_i\cos^2(\pi V/(2V_{pai}+\Phi))$ where $I_i$ is the intensity of an input optical signal, $V_{pai}$ is a voltage for switching the modulator from "ON" to "OFF", and $\Phi$ is a phase imbalance amount between two waveguides.

Hereinafter, it is described how the operating point of the optical modulator for each wavelength is selected in the first embodiment.

First, all wavelength-division-multiplexed signals are previously chirped (e.g., phase changed) with the same α parameter for evaluation of their characteristics after transmission. This evaluation examines how the transmission penalty varies with wavelength for α for a certain value. As an evaluation method conducted beforehand, numerical simulation or a transmission experiment may be employed using an actual transmission path. In this evaluation, both of two αs should be investigated for single-electrode-drive modulators. For push-pull-drive modulators, it is sufficient to evaluate at four or five α values, for example −1, −0.5, 0, +0.5 and 1, and 1, and is typical for Mach-Zehnder optical modulators.

Figure 3:
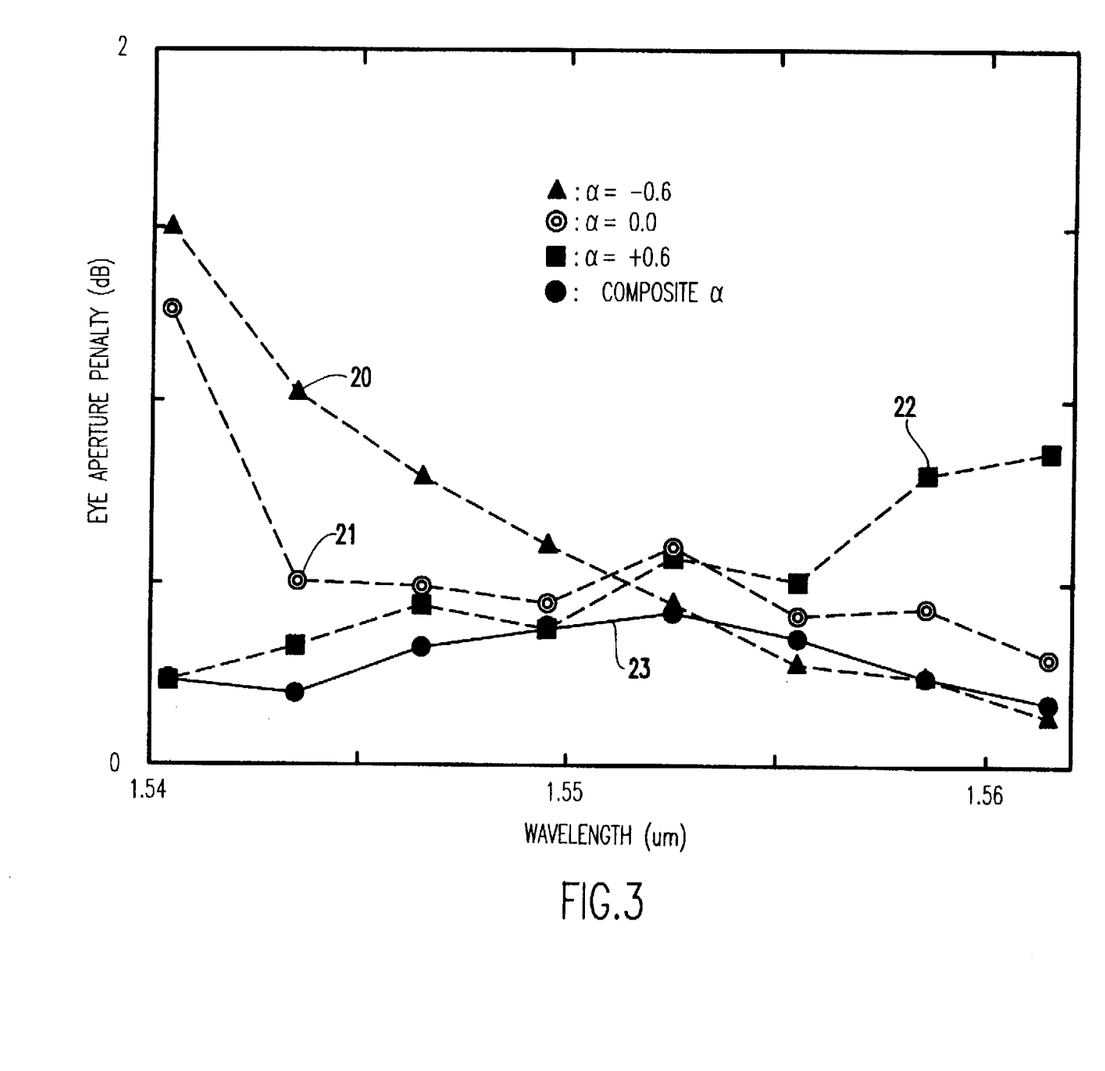
FIG. 3 is a graph showing results of calculation for eye aperture penalty after transmission over 100 km of ordinary dispersion fiber optics in the first embodiment of the present invention shown in FIG. 1.

FIG. 3 shows the eye aperture ratio, α=−0.6 (as shown by curve 20 in FIG. 3), α=0.0 (as shown by curve 21), and α=+0.6 (e.g., as shown by curve 22) after eight wave-division-multiplexed signals with a 3 mm interval are transmitted through 100 km of ordinary dispersion fiber optics obtained through numerical simulation. The value of the α parameter is selected for each wavelength from the curves shown in FIG. 3 through the procedure described above.

Here, it is assumed that a Mach-Zehnder optical modulator with a single electrode is used as the optical modulator 3, and that the value of the α parameter which can be selected is either one of α=+0.6 or −0.6. As mentioned above, generally, the value of α is varied between −1 and 1 in a single-electrode-drive modulator.

The eye aperture penalty characteristics after transmission of a wavelength division-multiplexed light with the best α parameter being set is as shown by curve 23 in FIG. 3. That is, in the first embodiment, the transmission deterioration can be minimized over a relatively wide wavelength range (e.g., 1.52 to 1.56 μm). Generally, the longer the transmission path, the smaller the wavelength employed. Obviously, other wavelengths could be employed depending upon the transmission path and the system configuration.

Figure 5A:
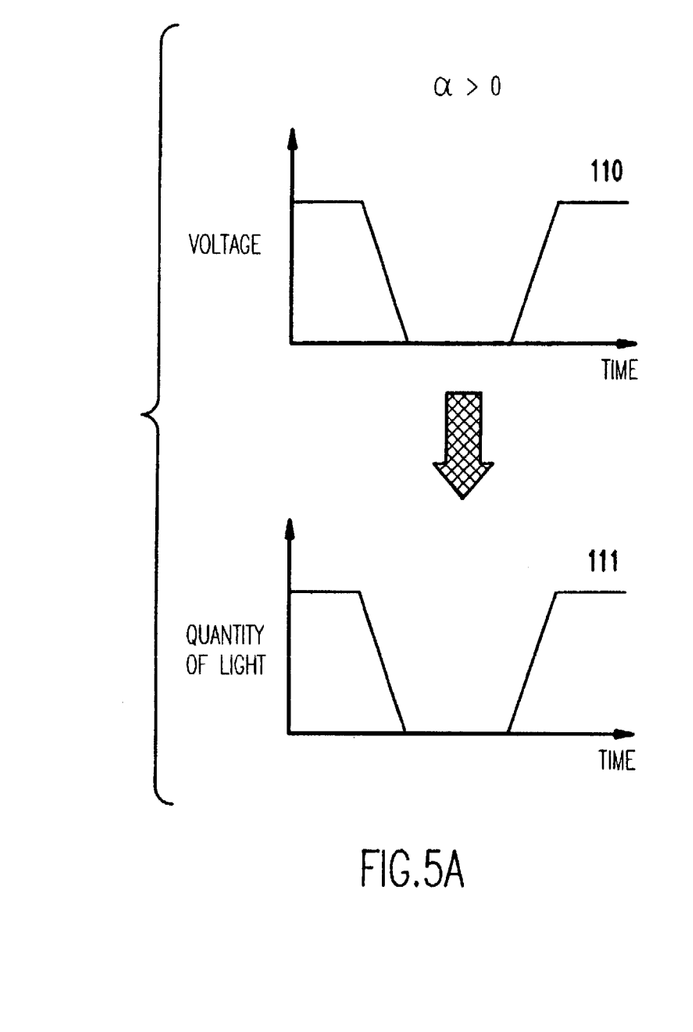
FIGS. 5(A)–5(B) are graphs illustrating correspondence between a waveform of an electrical signal and a waveform of an optical signal, when light is modulated at two operating points of the single-electrode driven Mach-Zehnder optical modulator.
Figure 5B:
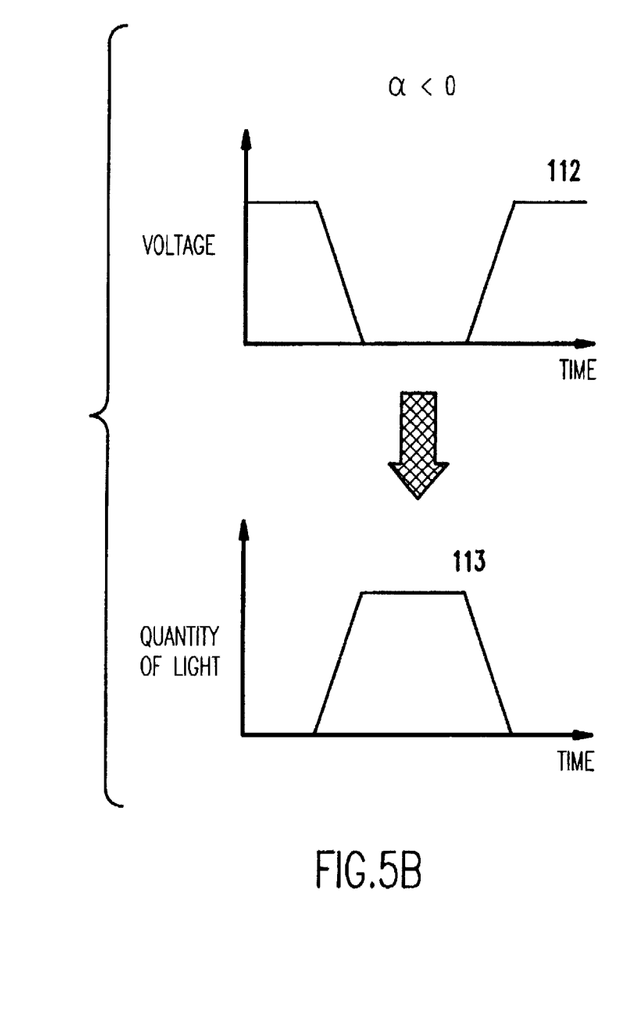

When the Mach-Zehnder optical modulator is used for the optical modulator 3 as in the first embodiment, while modulation is performed at an operating point (e.g., 101 or 102) in FIG. 4 which differs depending on the sign (positive or negative polarity) of the α parameter desired to be generated, the logic (e.g., "high" or "low" level) of the input electrical signal and the logic of the optical signal ("ON" or "OFF") have an opposite relationship as shown in FIGS. 5(a) and 5(b), respectively.

That is, referring to FIG. 5(a), the optical signal turns "ON" or "OFF" in correspondence to the high or low level of the input voltage when the α parameter is positive. In contrast, in FIG. 5(b) the relationship between the high/low level of the input voltage and the ON/OFF of the optical signal is reversed when the α parameter is negative.

Therefore, when the operating point is changed to reverse the sign of the α parameter, the logic for the received signal is reversed so that correct information cannot be transmitted. Then, a function must be provided for a transmitter or a receiver for reversing the logic of the electrical signal according to the sign of the α parameter. Such circuitry for reversing the electrical signal after sensing the α parameter is believed to be well within the grasp of one ordinarily skilled in the art, and thus for brevity will not be discussed in detail herein.

Thus, according to the first embodiment of the present invention each of the optical modulators is controlled to operate with only one of the positive chirp (positive α parameter) or the negative chirp (negative α parameter), depending upon whether the transmission penalty will be minimized at the modulating light wavelength (e.g., the wavelength of the modulating light shorter or longer than the zero-dispersion wavelength). The optical modulators may be set only once for a given fiber optic system. Generally, a controller will not be required otherwise the dispersion value of the transmission fiber changes. Furthermore, the invention may automatically compensate for changes/additions to the fiber optic system if an in-service fiber dispersion monitoring system (not illustrated) is employed. Thus, with a feedback loop from the transmission path circuitry to the transmitter path, such compensation may be provided adaptively. However, for the addition of fibers, it will not be available because the penalty characteristic curve will change drastically.

Second Embodiment

Figure 6:
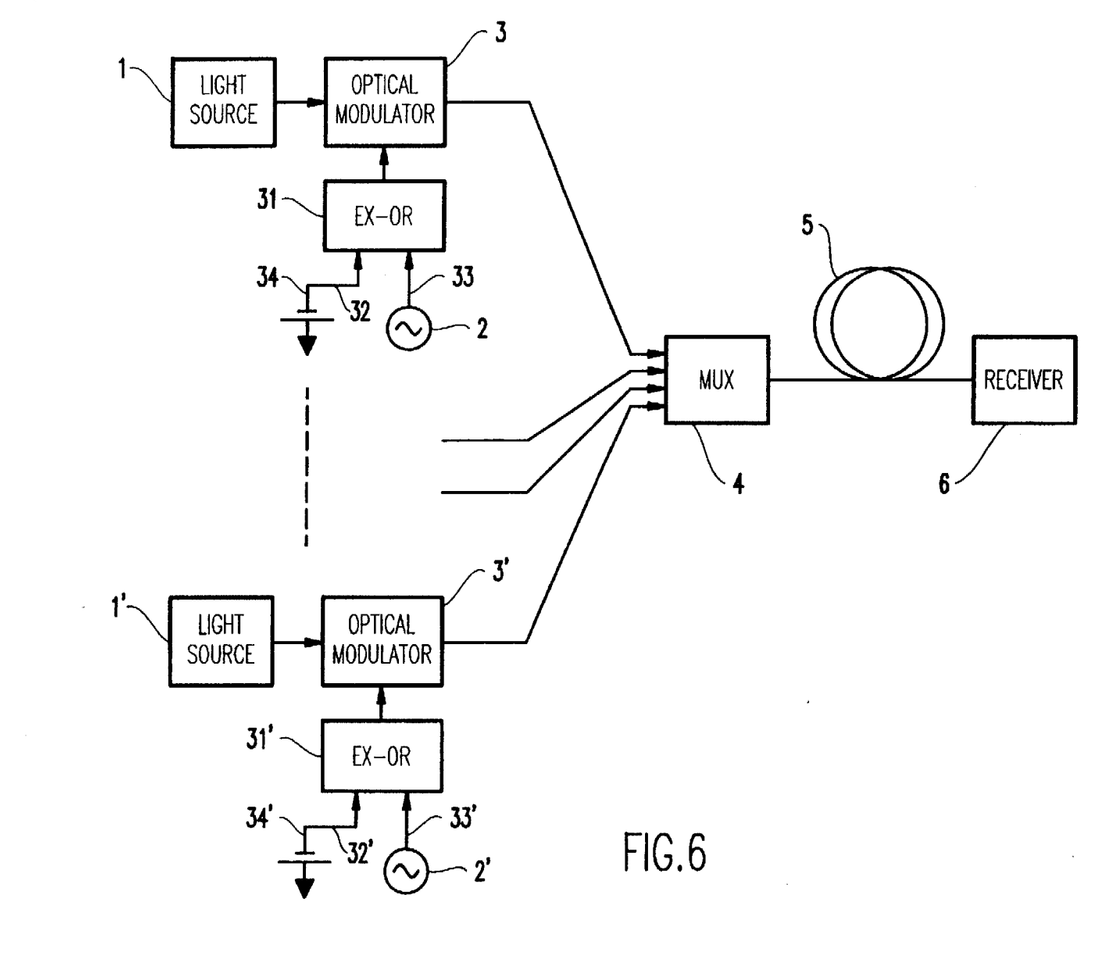
FIG. 6 illustrates an arrangement of a second embodiment of a wavelength division multiplexing fiber optics communication apparatus according to the present invention.

As an improvement over the first embodiment of FIG. 1, a second embodiment of the present invention, as shown in FIG. 6, provides a transceiver for reversing the logic of the electrical signal according to the sign of the α parameter. For brevity, components similar to those of the first embodiment will not be described in detail.

Specifically, an electrical signal from a signal source 2 is input to a second input port 33 of an exclusive logical sum circuit (EX-OR) 31. A first input port 32 of the exclusive logical sum circuit 31 receives a control voltage 34 from a control voltage source (e.g., an external voltage source) for reversing the logic of the signal.

When the control voltage 34 is at a "0" level (e.g., a low level) of the exclusive logical sum circuit 31, the electrical signal from the signal source 2 is not reversed in its logic, and therefore drives the optical modulator 3 as it is.

When the control voltage 34 is at a "1" level (e.g., a high level), the electrical signal from the signal source 2 has its logic reversed, and is input to the EX-OR gate 31 to drive the optical modulator 3. Thus, if the control voltage 34 is established according to the sign of the α parameter, the transmission may be performed at a correct signal logic, regardless of the setting of the α parameter value at the transmitter or receiver end.

Additionally, in lieu of the optical modulator 3 shown in FIGS. 1 or 6, an electro-absorption modulator (hereinafter referred to as a "EA modulator") may be employed, which includes semiconductors for the optical modulator. The EA modulator includes multiple semiconductor layers of III–V semiconductor crystals, and it absorbs the input light in accordance with the applied voltage. This absorbing effect is known as the Frantz-Keldish effect of the semiconductors. This aspect of the second embodiment is a modification of the structure of the first embodiment, and specifically the optical modulator which in the first embodiment preferably was formed by a Mach-Zehnder optical modulator.

Figure 8:
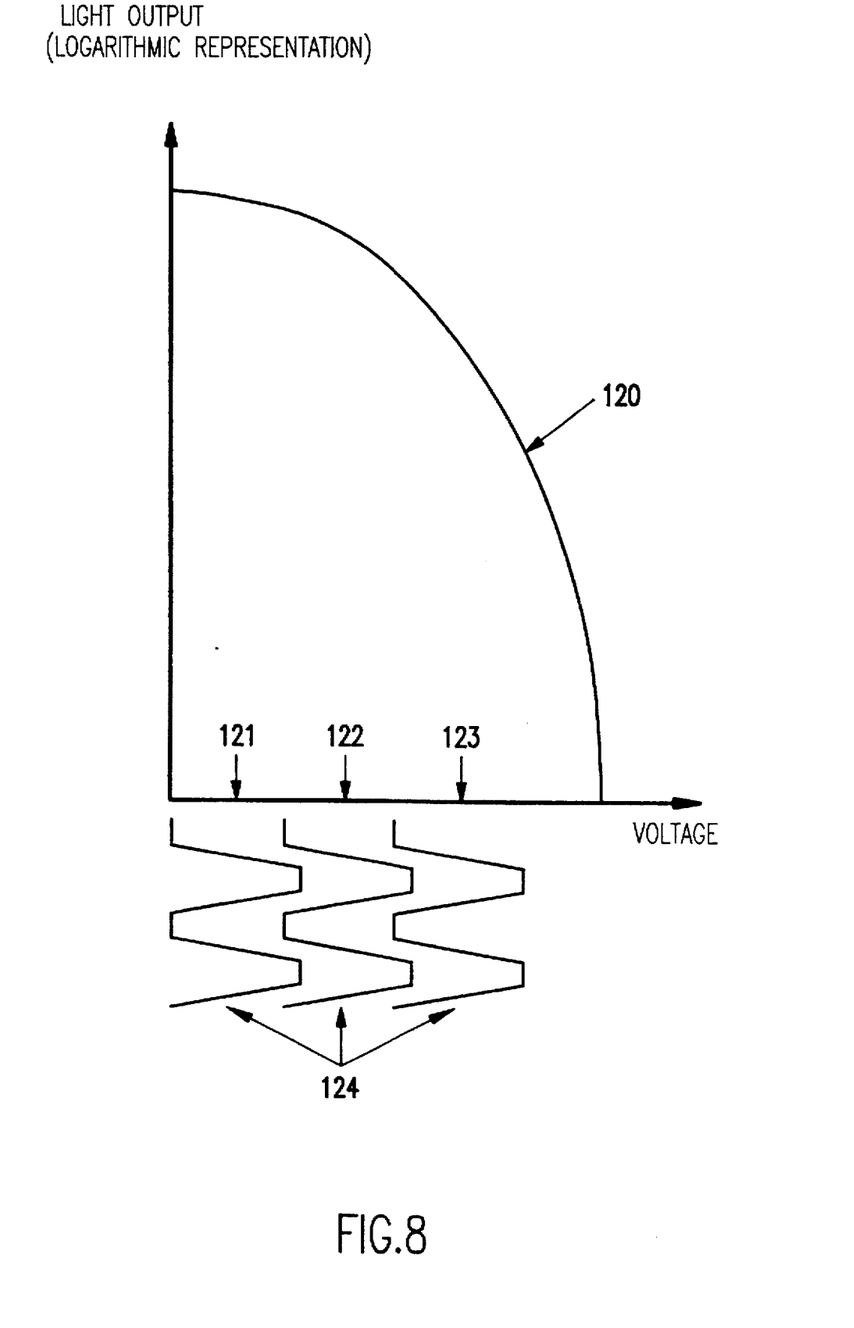
FIG. 8 illustrates extinction characteristics of a semiconductor electro-absorption modulator, and modulation at a plurality of different bias points.

The semiconductor EA modulator is a modulator having extinction characteristics, as shown in FIG. 8, in which the value of the α parameter varies as the center of operating point (hereinafter called the "bias point") of the driving waveform of the modulator is changed as shown by arrows 121–123.

The variable range of the α parameter available for the EA modulator extends from positive to negative, as reported in, for example, J. A. J. Fells, et al., "Transmission Beyond the Dispersion Limit Using a Negative Chirp Electro-Absorption Modulator," Electronics Letters, Vol. 30, No. 14, p. 1168 (1994) which details success of transmission through ordinary dispersion fiber over a long distance by implementing a negative value of the α parameter for the EA modulator.

When a bias point of the modulator is set for each wavelength by utilizing the above structure, the same effect and advantage may be obtained as when the Mach-Zehnder modulator is used as the optical modulator 3 described in the first embodiment of the present invention.

Additionally, since in the second embodiment with the EA modulator the logic of the electrical and optical signals does not change depending on the bias point, the logic reversal circuit, including the exclusive logical sum circuit 31 and the control voltage 34 as illustrated in FIG. 6, is not required. Thus, the Mach-Zehnder optical modulator of FIG. 6 having the logic reversal circuitry is not required.

However, with the EA modulator, the range in which the value of α parameter can be varied is narrow when compared to the Mach-Zehnder modulator, so that the range of wavelengths usable for transmission is narrowed. The wavelength range changes with the dispersion value, bit-rate and other parameters.

Furthermore, since the transmission wavelength is changed as the bias point is changed, the transmission quality may be deteriorated. For example, the transmission quality is decreased by 3 dB for minimum optical power to achieve $10^{-9}$ bit error rate, as compared to the Mach-Zehnder modulator.

Thus, when the value of α parameter is controlled by the operating point in the EA modulator, the second embodiment has difficulty fully achieving the effect and advantage of the present invention when compared to the first embodiment of the invention using the Mach-Zehnder modulator.

Third Embodiment

Figure 7:
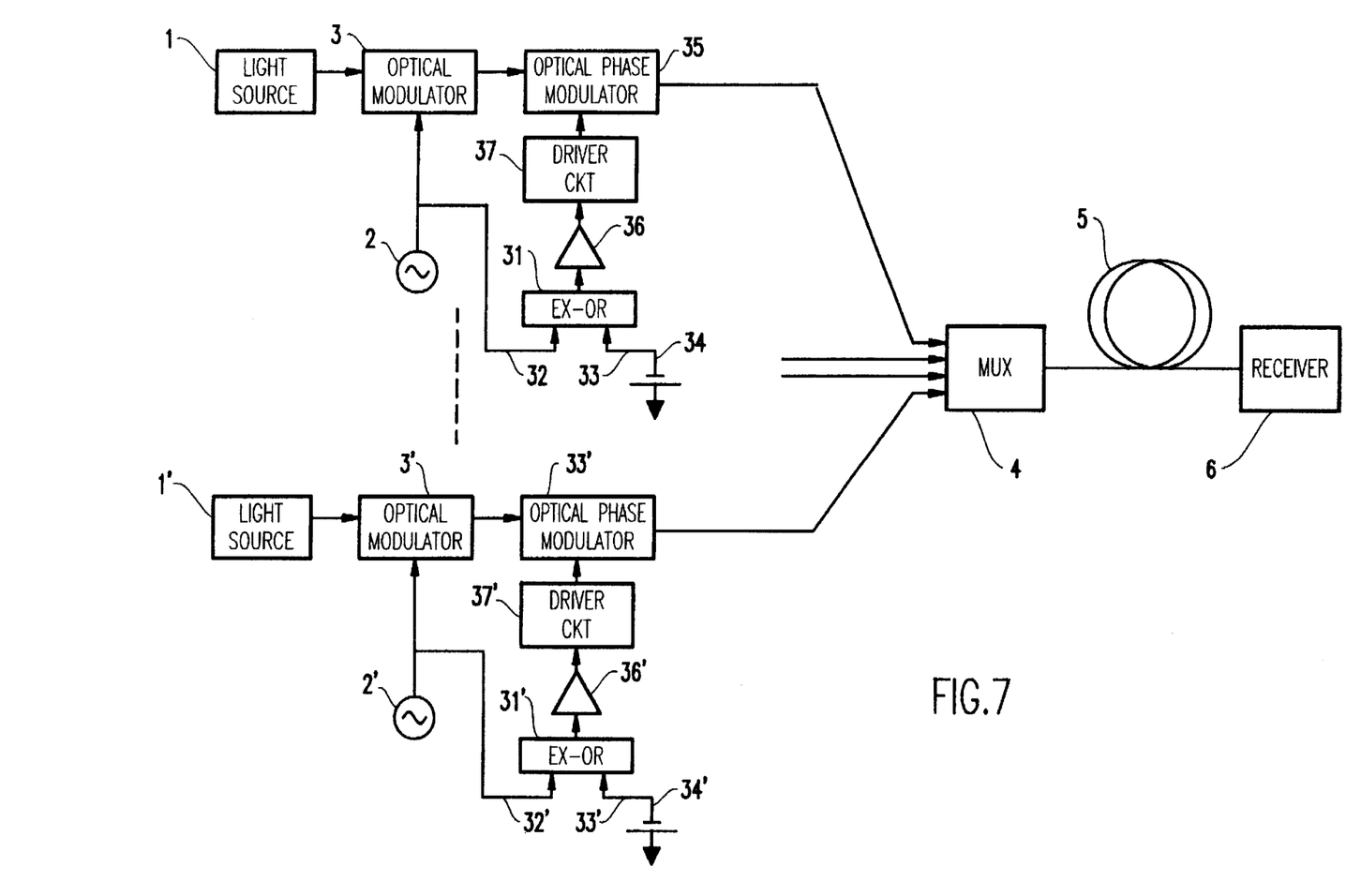
FIG. 7 illustrates an arrangement of a third embodiment of a wavelength division multiplexing fiber optics communication apparatus according to the present invention.

A third embodiment of the present invention, as shown in FIG. 7, provides an arrangement for controlling the value of the α parameter by connecting an optical phase modulator 35 following the optical intensity modulator 3 such as an EA modulator (or a Mach-Zehnder optical modulator, and providing a chirp later. The optical phase modulator 35 preferably comprises a LiNbO₃ or a III–V semiconductor waveguides. The LiNbO₃ waveguide phase modulator is commercially available, and the semiconductor phase modulator is believed to be producible by one of ordinary skill in the art. None of the phase modulators requires any special characteristics other than the ordinary phase modulators.

Specifically, a modulated signal from a signal source 2 is divided into first and second signals. The first signal is for driving an optical modulator 3 to modulate the intensity of light outputted from a light source 1. The second signal is applied to an exclusive-logical sum circuit 31 and a driver 36, and is for driving an optical phase modulator 35, so as to phase-modulate the intensity-modulated light from the optical modulator 3.

In this case, the amount of phase change in the optical phase modulator 35 is controlled by an output amplitude of the driver 36. Additionally, the orientation of phase change is determined by the voltage source 34, which may or may not reverse the logic of the output signal of the exclusive-logical sum (EX-OR) circuit 31. The bit-reverse action of the EX-OR has already been discussed above with regard to the second embodiment.

The second signal (e.g., of the two divided from the signal source 2) is input into the first input port 32 of the exclusive logical sum circuit 31, while the control voltage 34 from the control voltage source is input into the second input port 33 of the exclusive-logical sum circuit 31.

Since the signal logic of the electrical signal from the signal source 2 is maintained when the control voltage 34 is at the "0" level (e.g., the low level), the phase modulation serves to increase the α parameter. Conversely, since the signal logic of electrical signal from the signal source 2 is reversed when the control voltage 34 is at the "1" level (e.g., the high level), the phase modulation serves to decrease the α parameter. The preferred (and most suitable) value of the α parameter is set for each wavelength by the control voltage signal 34 and the amplitude of the driver 36.

Furthermore, the intensity modulation component provided by the optical modulator 3 and the phase modulation component provided by the optical phase modulator 35 are phase-matched by a variable delay line 37 following the driver 36.

As a result, the present invention may be applied to an optical modulator such as an EA modulator for which the α parameter cannot be freely varied. This is a key advantage of the third embodiment.

With the unique and unobvious structure and operation of the present invention and as described above, according to the present invention, in a system for wavelength division multiplexing high-speed time division multiplexed signals for transmission, the amount of deterioration may be kept low (e.g., 0.5 dB) for all wavelengths after transmission over a predetermined distance (e.g., within a range of 1.52 to 1.57 μm), so that a usable wavelength range can be expanded. Additionally, when the usable wavelength range is limited to a predetermined range (e.g., such as 1.54 to 1.56 μm), the maximum distance can be extended for transmission.

Thus, with the invention, a relatively simple wavelength division multiplexing fiber optics communication system is provided which is not limited in its wavelength range or transmission distance typically caused by waveform distortion due to the wavelength dependency of dispersion of the transmission path.

While the invention has been described in terms of several preferred embodiments, those skilled in the art will recognize that the invention can be practiced with modification within the spirit and scope of the appended claims.

Having thus described our invention, what we claim as new and desire to secure by letters patent is as follows:

1. A wavelength-division multiplexing fiber optics communication apparatus, comprising:

a plurality of optical modulators for respectively modulating an intensity of light, each said light having a different wavelength from one another, with respective signals to be transmitted;

a wavelength-division multiplexer for combining the light from said plurality of optical modulators;

fiber optics for transmitting wavelength-division multiplexed light from said wavelength-division multiplexer; and an optical receiver for separating said wavelength-division multiplexed light by wavelength and receiving the separated wavelength-division multiplexed light, respectively, wherein a magnitude in one of a change of phase modulation and a phase modulation is different for each of said plurality of optical modulators.

2. The wavelength-division multiplexing fiber optics communication apparatus according to claim 1, further comprising a plurality of light sources for emitting said light each having a different wavelength, wherein respective wavelength values of said plurality of light sources and wavelength dispersion values of said fiber optics in each wavelength of said light sources are predetermined.

3. The wavelength-division multiplexing fiber optics communication apparatus according to claim 2, wherein each of the optical modulators corresponding to respective one of said light sources is controlled, for the light sources emitting light having a wavelength for which a dispersion value of the fiber optics becomes negative, to increase a phase of the light as an intensity of the light increases, and wherein each of the optical modulators corresponding to said light sources is controlled, for the light sources emitting light having a wavelength for which the dispersion value of the fiber optics becomes positive, to decrease the phase of light as the intensity of the light increases.

4. The wavelength-division multiplexing fiber optics communication apparatus according to claim 3, wherein each of the optical modulators corresponding to respective one of said light sources is controlled, for the light sources emitting light having a wavelength for which a dispersion value of the fiber optics becomes a first value, to adjust in a first direction a phase of the light as an intensity of the light increases, and wherein each of the optical modulators corresponding to said light sources is controlled, for the light sources emitting light having a wavelength for which the dispersion value of the fiber optics becomes a second value, to adjust the phase of light in a second direction as the intensity of the light increases.

5. The wavelength-division multiplexing fiber optics communication apparatus according to claim 1, wherein said magnitude of one of said change of phase modulation and said phase modulation, caused at a same time said plurality of optical modulators modulate the intensity of light, is different for each of said plurality of optical modulators.

6. The wavelength-division multiplexing fiber optics communication apparatus according to claim 1, wherein said optical modulators for changing a phase of light when intensity of the light changes, includes a Mach-Zehnder optical modulator.

7. The wavelength-division multiplexing fiber optics communication apparatus according to claim 1, wherein said optical modulators change a phase of light when intensity of the light changes, said optical modulators include a semiconductor electro-absorption modulator.

8. The wavelength-division multiplexing fiber optics communication apparatus according to claim 1, wherein said optical modulators change a phase of light when intensity of the light changes, and include a plurality of optical intensity modulators and a plurality of optical phase modulators.

9. The wavelength-division multiplexing fiber optics communication apparatus according to claim 1, further comprising:

a circuit for logically reversing a signal to be transmitted at each wavelength with an external signal.

10. A wavelength-division multiplexing fiber optics communication apparatus comprising:

a plurality of optical modulators for respectively modulating an intensity of light, each said light having a different wavelength from one another, with respective signals to be transmitted, to produce a light output;

a wavelength-division multiplexer for combining the light output from said plurality of optical modulators to produce wavelength-division multiplexed light;

fiber optics for transmitting wavelength-division multiplexed light from said wavelength division multiplexer; and an optical receiver for separating said wavelength-division multiplexed light by wavelength and for receiving the separated wavelength-division multiplexed light, respectively, wherein said plurality of optical modulators are arranged to control operating points defining one of an amount of change of phase modulation and an amount of phase modulation, so as to control a phase change of said light output.

11. The wavelength-division multiplexing fiber optics communication apparatus according to claim 10, further comprising a plurality of light sources for emitting said light each having a different wavelength.

12. A fiber optic communication system comprising:

a plurality of modulators for respectively modulating a light with a signal and outputting a modulated light, each said light having a different wavelength from one another;

a multiplexer, connected to said plurality of modulators, for multiplexing said modulated light; and a receiver, connected to said multiplexer, for receiving said modulated light, wherein each said modulator adjusts said light such that said modulated light has only one of a first state and a second state, said first state having an equal and opposite value from that of said second state.

13. A system as in claim 12, wherein said plurality of modulators comprise a plurality of Mach-Zehnder optical modulators.

14. A system as in claim 13, wherein a Mach-Zehnder optical modulator of said Mach-Zehnder optical modulators includes a judging circuit for determining whether an aperture eye penalty is lower when said Mach-Zehnder optical modulator outputs said first state or said second state.

15. A system as in claim 12, wherein each modulator of said plurality of modulators, comprises:

an optical intensity modulator for modulating an optical intensity of said light.

16. A system as in claim 15, wherein each modulator of said plurality of modulators, further comprises:

a phase modulator, connected to said optical intensity modulator, for modulating a phase of said light.

17. A system as in claim 12, wherein said modulators include a judging circuit for determining whether said first state or said second state produces a lower distortion of said modulated light.

18. A system as in claim 12, further comprising an exclusive-OR circuit connected to said modulators.

19. A system as in claim 12, further comprising fiber optics coupling said receiver and said multiplexer.

20. A method of providing wavelength-division multiplexing communication, said method comprising:

modulating respectively an intensity of light signals, each said light signal having a different wavelength from one another, with respective signals to be transmitted, to produce a plurality of light outputs;

wavelength-division multiplexing said light outputs by combining the light outputs to produce wavelength-division multiplexed light;

transmitting said wavelength-division multiplexed light along fiber optics; and separating said wavelength-division multiplexed light by wavelength, and receiving the separated wavelength-division multiplexed light, respectively, wherein said step of modulating comprises controlling operating points defining one of an amount of change of phase modulation and an amount of phase modulation, so as to control a phase change of said light outputs.

* * * * *